United States Patent
Park et al.

(10) Patent No.: US 9,736,326 B2
(45) Date of Patent: *Aug. 15, 2017

(54) IMAGE FORMING APPARATUS AND LOW POWER DRIVING METHOD THEREOF

(71) Applicant: SAMSUNG ELECTRONICS CO., LTD., Suwon-si, Gyeonggi-do (KR)

(72) Inventors: Ho-beom Park, Suwon-si (KR); Sung-uk Bin, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,938

(22) Filed: Aug. 18, 2015

(65) Prior Publication Data

US 2015/0358494 A1    Dec. 10, 2015

Related U.S. Application Data

(63) Continuation of application No. 12/659,579, filed on Mar. 12, 2010, now Pat. No. 9,141,574.

(30) Foreign Application Priority Data

Sep. 9, 2009    (KR) .................. 10-2009-0084921

(51) Int. Cl.
   *H04N 1/00*    (2006.01)
   *G06F 1/32*    (2006.01)
   (Continued)

(52) U.S. Cl.
   CPC ....... *H04N 1/00896* (2013.01); *G06F 1/3209* (2013.01); *G06F 1/3215* (2013.01);
   (Continued)

(58) Field of Classification Search
   CPC .... G06F 1/3209; G06F 1/3284; G06F 1/3293; G06F 13/385; G06F 1/3215;
   (Continued)

(56) References Cited

U.S. PATENT DOCUMENTS 6,903,830 B1    6/2005  Hane et al.
6,904,532 B2 *  6/2005  Matsumoto ............. G06F 1/266
                                                  700/297

(Continued)

FOREIGN PATENT DOCUMENTS

EP    1035499 A2    9/2000
JP    2000-326590   11/2000

OTHER PUBLICATIONS

Korean Office Action dated Jan. 4, 2012 from Korean Patent Application No. 10-2010-0058266.

(Continued)

*Primary Examiner* — Iriana Cruz
(74) *Attorney, Agent, or Firm* — Staas & Halsey LLP

(57) ABSTRACT

An image forming apparatus having a USB communication function includes a control interface unit to perform USB control communication, a data interface unit to perform USB data communication, and a control unit to perform an event in a low power mode according to a signal input through the control interface unit, and to perform an event in a normal mode according to a signal input through the control interface unit and the data interface unit. Therefore, the low power mode may be effectively implemented.

21 Claims, 6 Drawing Sheets

(51) Int. Cl.
*G06F 13/38* (2006.01)
*G06K 15/00* (2006.01)

(52) U.S. Cl.
CPC .......... *G06F 1/3284* (2013.01); *G06F 1/3293* (2013.01); *G06F 13/385* (2013.01); *G06K 15/00* (2013.01); *H04N 1/00907* (2013.01); *H04N 1/00954* (2013.01); *G06F 2213/0042* (2013.01); *H04N 2201/0094* (2013.01); *Y02B 60/121* (2013.01); *Y02B 60/1235* (2013.01); *Y02B 60/1267* (2013.01); *Y02B 60/32* (2013.01)

(58) Field of Classification Search
CPC ............ G06F 2213/0042; G06K 15/00; H04N 1/00896; H04N 1/00907; H04N 1/00954; H04N 2201/0094; Y02B 60/121; Y02B 60/1235; Y02B 60/1267; Y02B 60/32
See application file for complete search history.

(56) References Cited

U.S. PATENT DOCUMENTS

| | | | |
|---|---|---|---|
| 7,057,754 | B1 | 6/2006 | Tsuchiya et al. |
| 7,430,054 | B2 * | 9/2008 | Masumoto ............. G06K 15/00 358/1.14 |
| 7,894,085 | B2 | 2/2011 | Maeda |
| 2003/0197886 | A1 | 10/2003 | Fujinaga et al. |
| 2005/0273541 | A1 | 12/2005 | Hayenga et al. |
| 2006/0023237 | A1 * | 2/2006 | Endo ..................... G06F 3/1254 358/1.13 |
| 2008/0034240 | A1 * | 2/2008 | Park ..................... G06F 1/3209 713/323 |
| 2008/0088634 | A1 | 4/2008 | Thompson et al. |
| 2009/0323120 | A1 | 12/2009 | Yamanaka |
| 2011/0019225 | A1 * | 1/2011 | Jung ..................... B41J 29/393 358/1.15 |

OTHER PUBLICATIONS

Examination Report dated Sep. 17, 2014 from European Patent Application No. 10157629.6, 7 pages.
European Search Report dated Dec. 16, 2010 from European Patent Application 10157629.6.
Office Action dated Apr. 23, 2012 from U.S. Appl. No. 12/659,579.
Office Action dated Nov. 7, 2012 from U.S. Appl. No. 12/659,579.
Advisory Action dated Feb. 28, 2013 from U.S. Appl. No. 12/659,579.
Office Action dated Jul. 2, 2014 from U.S. Appl. No. 12/659,579.
Notice of Allowance dated Jan. 29, 2015 from U.S. Appl. No. 12/659,579.
Notice of Allowance dated May 11, 2015 from U.S. Appl. No. 12/659,579.
U.S. Appl. No. 12/659,579, filed Mar. 12, 2010, Ho-beom Park, Samsung Electronics Co., Ltd.
European Summons to Oral Proceedings dated Dec. 19, 2016 from European Patent Application No. 10157629.6, 10 pages.
Implementers Forum: "Universal Serial Bus Specification Revision 2.0—Chapters 1-5 and 9", Internet Citation, Apr. 27, 2000 (Apr. 27, 2000), XP002412161, Retrieved from the Internet: URL:http://www.usb.org/developers/docs/usb_20_05122006.zip, 147 pages.

* cited by examiner

FIG. 4

| | | | A | | | | | | | | | |
|---|---|---|---|---|---|---|---|---|---|---|---|---|

LeCroy USB Adviser Bus And Protocol Analyzer-[w:\subin\SCX5635_Idle_print.usb]

File Setup Record Report Search View Window Help

| Transfer | H | Control | ADDR | ENDP | D | Tp | R | bRequest | wValue | wIndex | wLength | Bytes Transferred | Time | Time Stamp |
|---|---|---|---|---|---|---|---|---|---|---|---|---|---|---|
| 48 | S | GET | 1 | 0 | D->H | V | 1 | 0x0A | 0x0001 | 0x0100 | 8 | 8 | 931.077ms | 00029.0550 4209 |
| 49 | S | GET | 1 | 0 | D->H | C | 1 | 0x00 | 0x0000 | 0x0100 | 257 | 110 | 882.346ms | 00029.7999 1301 |
| 50 | S | GET | 1 | 0 | D->H | C | 1 | 0x00 | 0x0000 | 0x0100 | 257 | 110 | 390.033μs | 00030.7057 7061 |
| 51 | S | GET | 1 | 0 | D->H | V | 1 | 0x0A | 0x0000 | 0x0100 | 8 | 8 | 326.967μs | 00030.7061 0463 |
| 52 | S | GET | 1 | 0 | D->H | V | 1 | 0x0A | 0x0001 | 0x0100 | 8 | 8 | 29.840ms | 00030.7063 5081 |
| 53 | S | GET | 1 | 0 | D->H | C | 1 | 0x00 | 0x0000 | 0x0100 | 257 | 110 | 303.633μs | 00030.7302 3003 |
| 54 | S | GET | 1 | 0 | D->H | V | 1 | 0x0A | 0x0000 | 0x0100 | 8 | 8 | 230.933μs | 00030.7304 6221 |
| 55 | S | GET | 1 | 0 | D->H | V | 1 | 0x0A | 0x0001 | 0x0100 | 8 | 8 | 27.268ms | 00030.7306 5077 |
| 56 | S | GET | 1 | 0 | D->H | C | 1 | 0x00 | 0x0000 | 0x0100 | 257 | 110 | 390.133μs | 00030.7524 6175 |
| 57 | S | GET | 1 | 0 | D->H | V | 1 | 0x0A | 0x0000 | 0x0100 | 8 | 8 | 216.533μs | 00030.7527 7083 |
| 58 | S | GET | 1 | 0 | D->H | V | 1 | 0x0A | 0x0001 | 0x0100 | 8 | 8 | 164.119ms | 00030.7529 5075 |
| 59 | S | GET | 1 | 0 | D->H | C | 1 | 0x00 | 0x0000 | 0x0100 | 257 | 110 | 289.067μs | 00031.0842 4729 |
| 60 | S | GET | 1 | 0 | D->H | V | 1 | 0x0A | 0x0000 | 0x0100 | 8 | 8 | 216.467μs | 00031.0844 7073 |
| 61 | S | GET | 1 | 0 | D->H | V | 1 | 0x0A | 0x0001 | 0x0100 | 8 | 8 | 209.480ms | 00031.0846 5061 |
| 62 | S | GET | 1 | 0 | D->H | C | 1 | 0x00 | 0x0000 | 0x0100 | 257 | 110 | 331.500μs | 00031.2522 3853 |
| 63 | S | GET | 1 | 0 | D->H | V | 1 | 0x0A | 0x0000 | 0x0100 | 8 | 8 | 318.067μs | 00031.2525 1243 |
| 64 | S | GET | 1 | 0 | D->H | V | 1 | 0x0A | 0x0001 | 0x0100 | 8 | 8 | 377.724ms | 00031.2527 5327 |

| Transfer | H | Bulk | ADDR | ENDP | Bytes Transferred | Time | Time Stamp |
|---|---|---|---|---|---|---|---|
| 65 | S | OUT | 1 | 1 | 4096 | 3.646ms | 00031.5549 3753 |
| 66 | S | OUT | 1 | 1 | 4096 | 2.604ms | 00031.5578 5013 |

IMAGE FORMING APPARATUS AND LOW POWER DRIVING METHOD THEREOF

CROSS-REFERENCE TO RELATED APPLICATIONS

This application is a continuation of U.S. patent application Ser. No. 12/659,579, filed on Mar. 12, 2010, which is currently pending, and claims all benefits accruing under 35 U.S.C. §119 from Korean Patent Application No. 10-2009-0084921, filed Sep. 9, 2009, in the Korean Intellectual Property Office, the disclosures of each of which are incorporated herein by reference.

BACKGROUND

1. Field

Aspects relate to an image forming apparatus and a low power driving method thereof.

2. Description of the Related Art

A low power mode is a mode in which the power supply to most of the modules is shut down or minimized so as to minimize power consumption when a system is inactive. In order to implement lower standby power, the power supply may be shut down to main memory (in general, external dynamic random access memory (DRAM)), or the main memory may enter self refresh state and internal memory (in general, internal static random access memory (SRAM)) which is not in use in system on chip (SOC) drives a program. SRAM usually uses small quantity of memory of approximately 128 kilobytes.

However, as in a Universal Serial Bus (USB) driver for printers or large-capacity storage devices, if bulk data transmission is required or the number of supportable interfaces is increased, space taken up by a stack is increased, so it is difficult to implement all functions of the USB driver in a small-capacity SRAM.

In addition, it is inefficient to apply large-capacity SRAM of a high cost.

If a device which is used as a USB device cuts off the power supply to the external DRAM so as to enter the low power mode, a USB driver in the external DRAM also stops its operation, so the device cannot communicate with a USB and a host device. In particular, if the host device, for example, a personal computer (PC) sends a specific operation command, for example, a printing command to the device through the USB, the host device cannot perform the command (that is, the PC recognizes that connection with the device is cut.). Accordingly, in a related art, the external DRAM should operate normally in the low power mode.

If power is continuously supplied to the external DRAM, standby power is consumed. To consume lower power, if the power supply is cut off to the external DRAM, the USB driver does not operate, so communication through the USB may be impossible. In this case, if a program which monitors the state of the device using the USB approaches, it is determined that the device is turned off, thereby causing inconvenience. For example, if the PC is connected to the printer through the USB and has a printer monitoring program, when the DRAM of the printer is turned off and the USB driver does not operate, the PC may recognize that the printer is in an abnormal state or connection with the printer is cut off.

Therefore, there is a need for a low power driving method of an image forming apparatus.

SUMMARY

Aspects provide an image forming apparatus and a low power driving method thereof.

Additional aspects and/or advantages will be set forth in part in the description which follows and, in part, will be apparent from the description, or may be learned by practice of the invention.

In accordance with an exemplary embodiment, there is provided an image forming apparatus including a control interface unit to perform Universal Serial Bus (USB) control communication, a data interface unit to perform USB data communication, and a control unit to perform an event in a low power mode according to a signal input through the control interface unit, and to perform an event in a normal mode according to a signal input through the control interface unit and the data interface unit.

According to an aspect, in the low power mode, if a signal is input through the data interface unit, the control unit may convert the low power mode into the normal mode.

According to an aspect, the image forming apparatus may further include a first memory unit to be used in the normal mode, a second memory unit to be used in the low power mode, and a power supply unit to supply power to the first memory unit and the second memory unit, wherein if the image forming apparatus operates in the low power mode, the control unit controls the power supply unit to cut off the power supply to the first memory unit.

According to an aspect, the control unit may include a main controller to control operation of the image forming apparatus in the normal mode, and a sub-controller to control operation of the image forming apparatus in the low power mode.

According to an aspect, in the low power mode, the sub-controller may check whether or not interrupt is caused by the control interface unit or the data interface unit.

According to an aspect, if interrupt is caused by the control interface unit, the sub-controller may process an event related to the interrupt, and if interrupt is caused by the data interface unit, the sub-controller may convert the low power mode into the normal mode.

According to an aspect, the control interface unit may be a control end point, and the data interface unit may be a bulk type IN/OUT end point.

In accordance with another exemplary embodiment, there is provided a low power driving method of an image forming apparatus which includes a control interface unit to perform Universal Serial Bus (USB) control communication, and a data interface unit to perform USB data communication, the method including checking whether or not a signal is input though the control interface unit or the data interface unit in a low power mode, and if a signal is input through the control interface unit, performing an event according to the input signal, and if a signal is input through the data interface unit, converting the low power mode into a normal mode.

According to an aspect, the method may further include if the image forming apparatus operates in the low power mode, cutting off the power supply to a first memory unit which is used in the normal mode, and maintaining the power supply to a second memory unit which is used in the low power mode.

According to an aspect, the method may further include if the image forming apparatus operates in the low power mode, cutting off the power supply to a main controller which controls operation of the image forming apparatus in the normal mode, and maintaining the power supply to a sub-controller which controls operation of the image forming apparatus in the low power mode.

According to an aspect, the control interface unit may be a control end point, and the data interface unit may be a bulk type IN/OUT end point.

In addition to the exemplary embodiments and aspects as described above, further aspects and embodiments will be apparent by reference to the drawings and by study of the following descriptions.

BRIEF DESCRIPTION OF THE DRAWINGS

A better understanding of the present disclosure will become apparent from the following detailed description of exemplary embodiments and the claims when read in connection with the accompanying drawings, all forming apart of the disclosure of this invention. While the following written and illustrated disclosure focuses on disclosing exemplary embodiments, it should be clearly understood that the same is by way of illustration and example only and that the invention is not limited thereto. The spirit and scope of the present invention are limited only by the terms of the appended claims. The following represents brief descriptions of the drawings, wherein:

FIG. 4 illustrates a USB packet analysis table according to an exemplary embodiment.

DETAILED DESCRIPTION

Figure 1A:
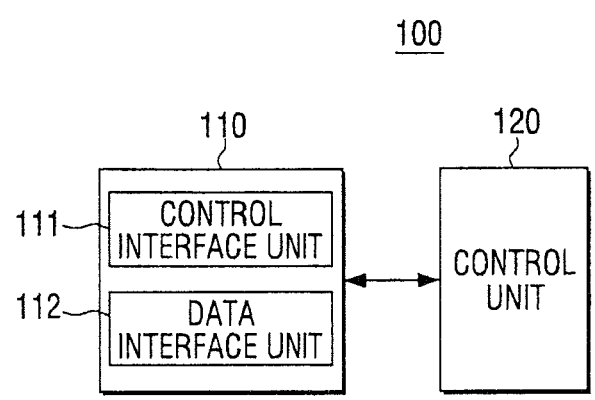
FIGS. 1A and 1B are block diagrams illustrating a configuration of an image forming apparatus according to an exemplary embodiment.

Reference will now be made in detail to the embodiments, examples of which are illustrated in the accompanying drawings, wherein like reference numerals refer to the like elements throughout. The embodiments are described below in order to explain the present invention by referring to the figures.

FIG. 1A is a schematic block diagram illustrating a configuration of an image forming apparatus according to an exemplary embodiment.

Referring to FIG. 1A, the image forming apparatus 100 may include a Universal Serial Bus (USB) interface unit 110 and a control unit 120. The image forming apparatus 100 may be printers, copiers, scanners, facsimile machines, or multifunction peripherals (MFPs) having combined functions in a single device.

The USB interface unit 110 performs USB communication with at least one external device. The at least one external device may be host devices such as personal computers (PCs).

The USB interface unit 110 may include a control interface unit 111 to perform USB control communication with the at least one external device, and a data interface unit 112 to perform USB data communication with the at least one external device.

More specifically, the USB interface unit 110 may be implemented as an end point which is a logical port. Detailed description is given below with reference to the following drawings.

The control unit 120 controls the overall operation of the image forming apparatus 100, and in particular, controls a low power mode and a normal mode of the image forming apparatus 100.

In the low power mode, the control unit 120 performs an event according to a signal input through the control interface unit 111, and in the normal mode, the control unit 120 performs an event according to a signal input through the control interface unit 111 and the data interface unit 112.

In the low power mode, if the control unit 120 receives a signal through the data interface unit 112, the control unit 120 enters the normal mode.

Figure 1B:
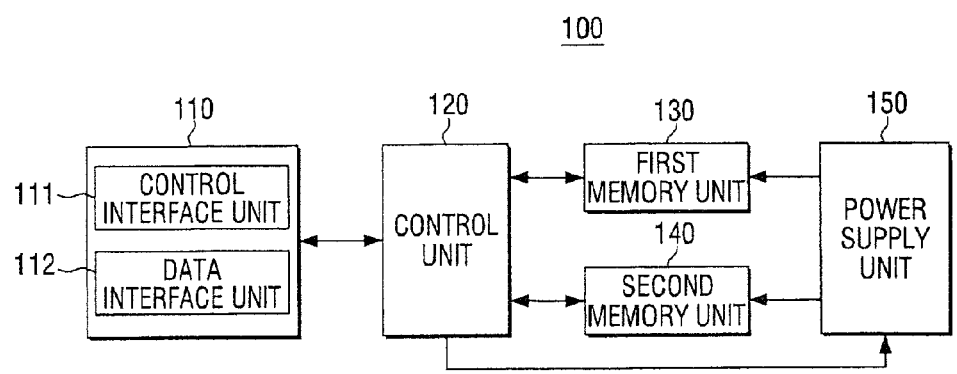

FIG. 1B is a block diagram illustrating a detailed configuration of the image forming apparatus shown in FIG. 1A.

Referring to FIG. 1B, the image forming apparatus 100 may include a USB interface unit 110, a control unit 120, a first memory unit 130, a second memory unit 140, and a power supply unit 150. Among the components of the image forming apparatus 100 of FIG. 1B, detailed description of components overlapping the image forming apparatus 100 of FIG. 1A is not repeated.

The control unit 120 converts the normal mode into the low power mode if a preset condition is satisfied, for example, if there is no command for a preset period of time. This is merely an example, and there may be diverse conditions for mode conversion.

In addition, the control unit 120 converts the low power mode into the normal mode if a preset condition is satisfied. For example, when the image forming apparatus 100 is a printer, if a panel key is input, a printing service is requested, of a fax rings, the control unit 120 converts the low power mode into the normal mode.

If the control unit 120 converts the normal mode into the low power mode, the control unit 120 copies a program to control the low power mode from the first memory unit 130 into an executable area of the second memory unit 140. The first memory unit 130 is main memory which may be implemented as, for example, dynamic random access memory (DRAM). The first memory unit 130 may store a program capable of supporting USB communication in the normal mode, applications, etc, including a USB driver.

The second memory unit 140 may store a program capable of supporting the low power mode, applications, and may be implemented as static random access memory (SRAM).

The program to control the low power mode includes the USB driver. The USB driver includes only a routine which is in charge of processing control end point and a routine which is needed to be woken to return to the normal mode. The program to control the low power mode requires lower capacity compared with the USB program which is stored in the first memory unit 130.

If copying the program to control the low power mode is complete, the control unit 120 cuts off the power supply to most of system modules and the image forming apparatus 100 enters the low power mode.

In the low power mode, the control unit 120 checks whether or not interrupt is caused by the control interface unit 111 or the data interface unit 112.

If interrupt is caused by the control interface unit 111, the control unit 120 processes a corresponding service.

If interrupt is not caused by the control interface unit 111 but caused by the data interface unit 112, the control unit 120 reads printing data, stores the printer data in the second memory unit 140, returns to the normal mode, and processes a corresponding service. This is merely an exemplary embodiment. According to whether the USB is in First In First Out (FIFO) mode or in direct memory access (DMA) mode, the control unit 120 may return to the normal mode and store printing data in the first memory unit 130.

More specifically, if interrupt is caused by the data interface unit 112, that is, if a specific operation command is input by the data interface unit 112, the control unit 120 stores data from the second memory unit 140 into the first memory unit 130 which is accessible by the USB driver in the normal mode. In this case, all hardware becomes active and if the USB driver begins its operation, the control unit 120 processes the interrupt and subsequently following events.

That is, in the low power mode, the image forming apparatus 100 according to the exemplary embodiment processes only a service input by the control interface unit 111. This is because the second memory unit 140 has limited storage capacity.

The power supply unit 150 supplies power to the first memory unit 130 and the second memory unit 140 according to operation of the control unit 120.

More specifically, the power supply unit 150 supports the low power mode by cutting off power to the first memory unit 130 and maintaining power supply to the second memory unit 140.

The control unit 120 may be implemented as only a main controller which supports both the normal mode and the low power mode, or implemented separately as a main controller, which supports the normal mode, and a sub-controller, which supports the low power mode.

If the control unit 120 is implemented as only a main controller, that is, if main firmware related to control of the normal mode and micro firmware related to control of the low power mode are implemented on a single chip, the low power mode may be implemented by lowering frequency of the main controller as described above or configuring a gated clock in designing the main controller and thus cutting off clock input for blocks which do not operate in the low power mode. In this case, the micro firmware may be built in an inner memory (SRAM) of the main controller. The SRAM maintains data without refresh, and is thus faster than the DRAM in reaction rate. As a result, fast conversion is enabled from the low power mode to the normal mode.

To the contrary, if the control unit 120 is implemented separately as a main controller and a sub-controller, that is, if main firmware related to control of the normal mode and micro firmware related to control of the low power mode are implemented on respective chips, the low power mode may be implemented by supplying power only to the sub-controller.

In the exemplary embodiment, the control unit 120 is implemented separately as a main controller and a sub-controller for convenience of description.

Figure 2:
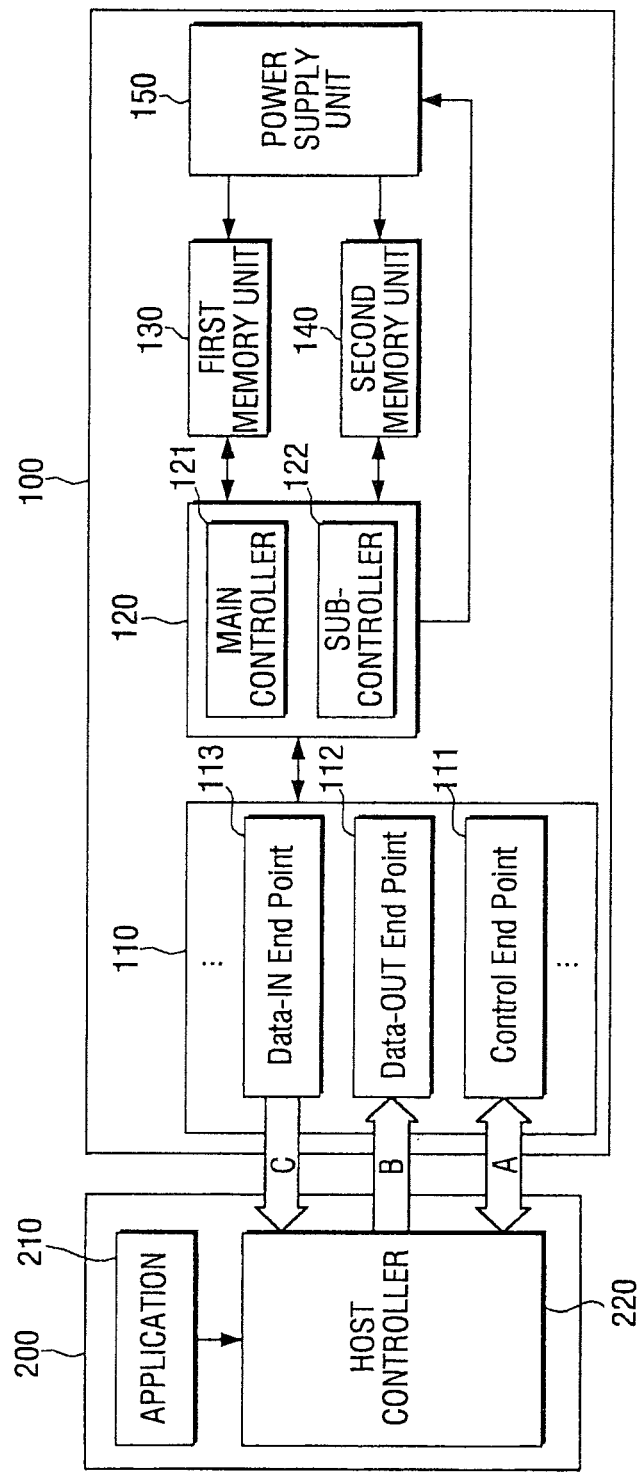
FIG. 2 is a block diagram illustrating the relation between the image forming apparatus shown in FIG. 1B and a host device.

FIG. 2 is a block diagram illustrating the relation between the image forming apparatus shown in FIG. 1B and a host device. Among the components shown in FIG. 2, detailed description of components overlapping components described in FIG. 1B is not repeated.

The host device 200 may be implemented as a personal computer (PC) or a user terminal device such as personal digital assistants (PDAs) and portable media players (PMPs).

The host device 200 may include an application 210 and a host controller 220.

The application 210 may be software supporting a USB function in an operating system (OS).

The host controller 220 indicates a USB bus interface of the host device 200, and includes all software and hardware which enable a USB device (that is, the image forming apparatus 100) to be connected to the host device 200.

The host device 200 may further include a printer driver (unnumbered) which converts printing data written using an application program into a printer language which can be interpreted by the image forming apparatus 100. The printer driver may be included in the host controller 220. In addition, the host device 200 may further include general components constituting host devices such as an input unit (not shown) and a display unit (not shown).

Hereinafter, general concept of an end point and a pipe is briefly described for better understanding of the embodiments.

An end point is a logical port and is an end of flow of communication, which has a unique identification (ID). An end point includes information regarding data transmission direction (an input end point and an output end point). An end point may include an access frequency of a bus, requirements in delay of access of a bus, requirements for bandwidth, the number of end points, requirements for error handling, the maximum size of packet which the end point can accept, the type of transmission, the transmission direction, etc.

A pipe is the link between an end point in a device and software in a host. A pipe is divided into a stream pipe and a message pipe according to features. A stream pipe and a message pipe are different and exclusive. A stream pipe has no defined USB format and supports one-way communication. A message pipe has a defined USB format and supports two-way communication.

Detailed description of an end point and a pipe is omitted here since USB specifications provide description thereof in detail.

The image forming apparatus 100 communicates with the host device 200 through a USB, and has a control end point 111 (the control interface unit which is described above) and a plurality of end points 112 and 113 (the data interface unit which is described above) in the USB interface unit 110. The end points except for the control end point 111 are slightly different according to a transmission method, but may be simply considered as logical ports for data transmission and are thus referred to hereinafter as data end points.

The control end point 111 is a logical port to determine whether or not the host device 200 is connected to the image forming apparatus 100 through a series of procedures called enumeration and, if connected, to obtain information regarding the image forming apparatus 100 or set the image forming apparatus 100 to be communicable with the host device 200. That is, the control end point 111 is used while enumeration is performed or a device on a bus operates (when the device is recognized). Accordingly, the control end point 111 is a basic end point to be in charge of connection/removal/recognition of a device, so any device should have one. In addition, the control end point 111 should be always controllable.

The control end point 111 uses a message pipe unlike the data end points, and thus enables two-way transmission.

The data end points 112 and 113 are used for data transmission, and may be at least one of bulk type IN/OUT end points, isochronous type IN/OUT end points, and interrupt type IN/OUT end points.

A bulk type IN/OUT end point exactly transmits comparatively a huge amount of data, with a total disregard for time, and retransmits data if a transmission error may occur in the bus. For example, a bulk type IN/OUT end point may be used for data transmission of a storage device such as a hard disk. In addition, a bulk type IN/OUT end point uses a stream pipe, and thus supports one-way transmission.

An isochronous type IN/OUT end point is used mainly for devices which values real-time communication such as audios above everything else, uses a stream pipe, and thus supports one-way transmission.

An interrupt type IN/OUT end point is used mainly for devices which need periodical signal transmission and reception, uses a stream pipe, and thus supports one-way transmission.

In general, since the image forming apparatus 100 requires large quantity of transmission, a bulk type IN/OUT end point may be used.

The data end points 112 and 113 may select the number and the direction according to feature of interface. A manufacturer may selectively determine the number and function of the data end points 112 and 113 according to specifications of the device.

Figure 3:
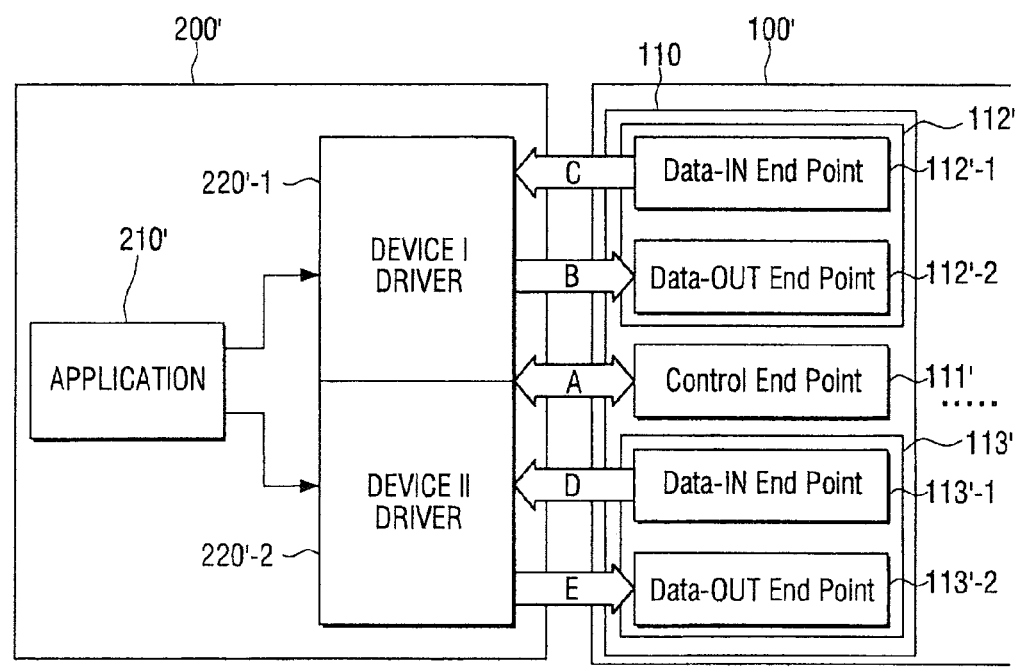
FIG. 3 is a block diagram illustrating a configuration of an end point according to an exemplary embodiment.

For example, a configuration of end points of a multi-function peripheral is shown in FIG. 3.

In FIG. 3, if it is assumed that an interface 1112' is for a printer and an interface II 113' is for a scanner, an OUT end point 112'-2 of the interface I 112' is an end point for receiving printing data from a host device 200', and an IN end point 113'-1 of the interface II 113' is an end point for transmitting scanned data from the host device 200'. In FIG. 3, the host device 200' includes first and second host controllers 220'-1 and 220'-2. The first and second host controllers 220'-1 and 220'-2 may include device drivers I and II, respectively (unnumbered).

A main controller 121 controls the normal mode.

That is, the main controller 121 controls a basic function of an image forming apparatus 100' such as copying, scanning, faxing, etc in the normal mode.

In addition, the main controller 121 converts the normal mode into the low power mode if a preset condition is satisfied, for example, if there is no command for a preset period of time. This is merely an example. When a specific user command is input, the main controller 121 may convert the normal mode into the low power mode.

That is, if the image forming apparatus 100 does not perform any job or if there is no operating command such as copying, scanning, and faxing which can be input using diverse user interfaces such as a panel on the image forming apparatus 100, a USB or a network for a preset period of time, the main controller 121 converts the normal mode into the low power mode.

If the main controller 121 converts the normal mode into the low power mode, the main control unit 121 copies a program to control the low power mode from the first memory unit 130 into an executable area of the second memory unit 140. The first memory unit 130 is main memory which may store a program required for the overall operation of the image forming apparatus 100, applications, etc. The first memory unit 130 may be implemented as DRAM and the second memory unit 140 may be implemented as SRAM.

The program to control the low power mode includes the USB driver. The USB driver includes only a routine which is in charge of processing control end point and a routine which is needed to be woken to return to the normal mode. The USB program which is stored in the second memory unit 140 requires lower capacity compared with the USB program which is stored in the first memory unit 130, and can thus be implemented as low capacity memory.

If copying the program to control the low power mode is complete, the power supply to most of system modules including the first memory unit 130 is cut off and the image forming apparatus 100 enters the low power mode.

In the low power mode, the sub-controller 122 checks whether or not interrupt is caused by the control end point 111 or the data end point 112.

If interrupt is caused by the control end point 111, the sub-controller 122 processes a corresponding event by executing the program and application stored in the second memory unit 140.

If interrupt is not caused by the control end point 111 but caused by the data end point 112, the control unit 120 reads printing data, stores the printer data in the second memory unit 140, returns to the normal mode, and processes a corresponding service. This is merely an exemplary embodiment. According to whether the USB is in First In First Out (FIFO) mode or in direct memory access (DMA) mode, the image forming apparatus 100 may return to the normal mode and store printing data in the first memory unit 130.

More specifically, if interrupt is caused by the data end point 112, that is, if a specific operation command is input by the data end point 112, the image forming apparatus 100 stores data from the second memory unit 140 into the first memory unit 130 which is accessible by the USB driver in the normal mode. In this case, all hardware becomes active and if the USB driver begins its operation, the image forming apparatus 100 processes the interrupt and subsequently following events.

The components illustrated in FIGS. 1 to 3 and the disposition thereof are merely an exemplary embodiment, so some elements may be deleted and more elements can be added according to circumstances. Their disposition also may change.

FIG. 4 illustrates a USB packet analysis table according to an exemplary embodiment.

Referring to FIG. 4, the printer driver 220 of the host device 200 transmits a manufacturer limitation or class limitation request to the image forming apparatus 100 through the control end point (end point 0: ENDP 0) on occasion. The subsequently following bulk transmission is a printing command through end point 1 (see reference letter "A"). This means that in the low power mode, requests may be continuously generated through the control end point. Such a manufacture limitation request may vary according to the manufacturer.

If the image forming apparatus 100 receives requests as shown in FIG. 4, the sub-controller processes requests for the control end point from Transfer 48 to Transfer 64. Subsequently, if the image forming apparatus 100 receives a printing command such as Transfer 65 through end point 1, the low power mode changes to the normal mode and the main controller processes a corresponding event.

Figure 5:
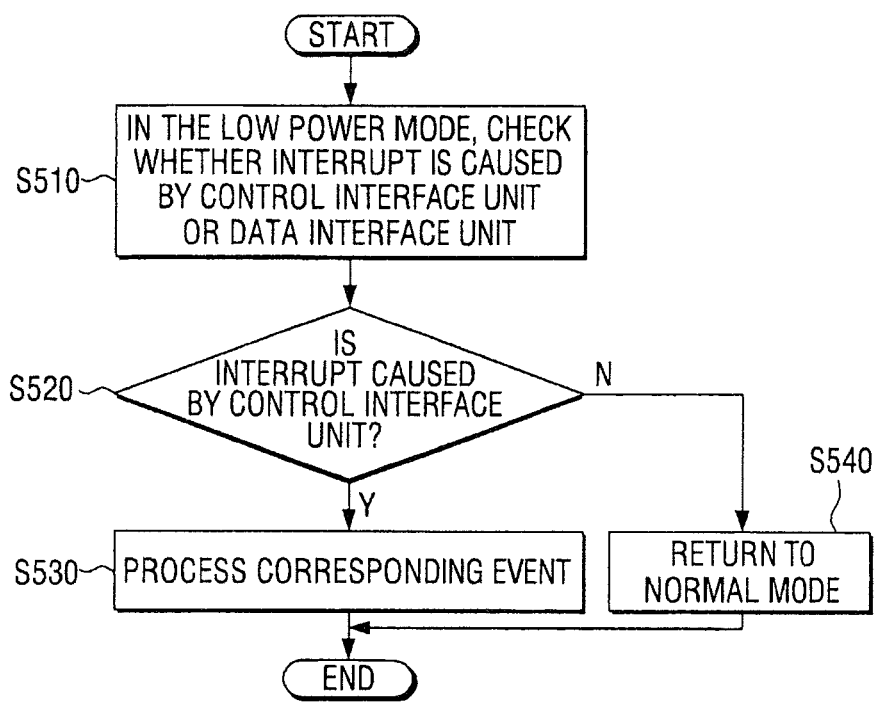
FIG. 5 is a flow chart illustrating a method for operating an image forming apparatus in a low power mode according to an exemplary embodiment.

FIG. 5 is a flow chart illustrating a method for operating an image forming apparatus in a low power mode according to an exemplary embodiment of the present invention.

Referring to FIG. 5, in operation S510, in the low power mode, it is checked whether or not interrupt is caused by the USB interface unit.

In operation S520, if interrupt is caused by the USB interface unit, it is determined whether or not the interrupt signal is caused by the control interface unit.

In operation S530, if the interrupt signal is caused by the control interface unit, the image forming apparatus processes a corresponding event.

In operation S540, if the interrupt signal is not caused by the control interface unit but caused by the data interface unit, the image forming apparatus returns to the normal mode.

Subsequently, in the normal mode, the image forming apparatus performs all events requested through both the control interface unit and the data interface unit.

The control interface unit performs USB control communication and may be a control end point.

The data interface unit performs USB data communication and may be a data end point, that is, all end points other than a control end point.

The control end point is a logical port to determine whether or not the host device is connected to the image forming apparatus through a series of procedures called enumeration and, if connected, to obtain information regarding the image forming apparatus or set the image forming apparatus to be communicable with the host device. That is, the control end point is used while enumeration is performed or a device on a bus operates (when the device is recognized). The control end point uses a message pipe unlike the data end point, and thus enables two-way transmission.

The data end point is used for data transmission, and may be at least one of bulk type IN/OUT end points, isochronous type IN/OUT end points, and interrupt type IN/OUT end points. The data end point uses a stream pipe, and thus supports one-way transmission.

The normal mode is controlled by the main controller and the low power mode is controlled by the sub-controller.

Applications and programs which are needed to operate in the normal mode may be stored in external memory such as DRAM.

Applications and programs which are needed to operate in the low power mode may be stored in internal memory such as DRAM.

If the image forming apparatus operates in the low power mode, the power supply is cut off to the external memory used in the normal mode and the power supply is maintained to the internal memory used in the low power mode.

As described above, according to the exemplary embodiment of the present invention, although the power supply is cut off to the main memory in which the USB driver operates, USB communication is enabled normally. Using small-capacity SRAM in the SOC, cost for an additional SRAM may be saved and the low power mode may be effectively implemented.

In the exemplary embodiment of the present invention, an image forming apparatus is described, but this is merely an example. The technical idea of the present invention may also be applied to any kinds of electronic devices capable of USB communication.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:
   an interface to perform Universal Serial Bus (USB) control communication by using a control signal received from a host device;
   a data interface to perform USB data communication by using data received from the host device; and
   a controller, connected to the interface and the data interface, to perform an event in a low power mode if a signal is received from the interface, and to perform an event in a normal mode if a signal is received from the data interface.

2. The image forming apparatus according to claim 1, wherein in the low power mode, if a signal is input through the data interface, the controller converts the low power mode into the normal mode.

3. The image forming apparatus according to claim 1, further comprising:
   a first memory to be used in the normal mode;
   a second memory to be used in the low power mode; and
   a power supply to supply power to the first memory and the second memory,
   wherein if the image forming apparatus operates in the low power mode, the controller controls the power supply to cut off the power supply to the first memory.

4. The image forming apparatus according to claim 3, wherein the controller comprises:
   a main controller to control operation of the image forming apparatus in the normal mode; and
   a sub-controller to control operation of the image forming apparatus in the low power mode.

5. The image forming apparatus according to claim 4, wherein in the low power mode, the sub-controller checks whether or not interrupt is caused by the interface or the data interface.

6. The image forming apparatus according to claim 5, wherein if interrupt is caused by the interface, the sub-controller processes an event related to the interrupt, and if interrupt is caused by the data interface, the sub-controller converts the low power mode into the normal mode.

7. The image forming apparatus according to claim 1, wherein the interface is a control end point, and the data interface is a bulk type IN/OUT end point.

8. A low power driving method of an image forming apparatus which comprises an interface to perform Universal Serial Bus (USB) control communication by using a control signal received from a host device, and a data interface to perform USB data communication by using data received from the host device, the method comprising:
   checking, by a controller, whether a signal is received from the interface and the data interface in a low power mode; and
   if a signal is received by the controller from the interface, processing an event corresponding to the input signal, and if a signal is received by the controller from the data interface, converting the low power mode into a normal mode.

9. The method according to claim 8, further comprising:
   if the image forming apparatus operates in the low power mode, cutting off the power supply to a first memory which is used in the normal mode, and maintaining the power supply to a second memory which is used in the low power mode.

10. The method according to claim 8, further comprising:
    if the image forming apparatus operates in the low power mode, cutting off the power supply to a main controller which controls operation of the image forming apparatus in the normal mode, and maintaining the power supply to a sub-controller which controls operation of the image forming apparatus in the low power mode.

11. The method according to claim 8, wherein the interface is a control end point, and the data interface is a bulk type IN/OUT end point.

12. An image forming apparatus, comprising:
    an interface to receive a control signal from a host device and to perform Universal Serial Bus (USB) control communication;
    a data interface to receive data from the host device and to perform USB data communication;

a controller, connected to the interface and the data interface, to control a low power mode and a normal mode of the image forming apparatus, to perform an event in the low power mode if a signal is received from the interface, and to perform an event in the normal mode if a signal is received from the data interface;

a first memory to be used in the normal mode; and a second memory to be used in the low power mode, wherein when the controller converts the normal mode into the low power mode, the controller stores a program to control the low power mode in the second memory.

13. The image forming apparatus according to claim 12, wherein the controller stores the program to control the low power mode in the second memory by copying the program from the first memory into an executable area of the second memory, and the program includes a USB driver having only a routine to process control end point and a routine to return to the normal mode.

14. The image forming apparatus according to claim 13, wherein the program to control the low power mode stored in the second memory requires lower capacity relative to a USB program stored in the first memory which includes the USB driver copied by the controller and stored in the second memory.

15. The image forming apparatus according to claim 12, wherein if an interrupt is caused by a data end point, the controller reads printing data, stores the printing data in the second memory, and returns to the normal mode, and the printing data from the second memory is stored in the first memory.

16. The image forming apparatus according to claim 12, wherein the controller comprises:
   a main controller to control operation of the image forming apparatus in the normal mode; and
   a sub-controller to control operation of the image forming apparatus in the low power mode,
   wherein if the low power mode power is supplied to the sub-controller and cut off to the main controller, the sub-controller checks whether an interrupt is caused by the interface or the data interface, and when an interrupt is caused by the interface the sub-controller executes the program stored in the second memory.

17. A low power driving method of an image forming apparatus which comprises an interface which receives a control signal from a host device to perform Universal Serial Bus (USB) control communication, and a data interface which receives data from the host device to perform USB data communication, the method comprising:

checking, by a controller, whether a signal is received from the interface or the data interface while the image forming apparatus is in a low power mode;

controlling a low power mode and a normal mode of the image forming apparatus;

converting the normal mode to the low power mode if a preset condition is satisfied by storing a program to control the low power mode in a memory; and if a signal is received by the controller from the interface, processing an event corresponding to the input signal, and if a signal is received by the controller from the data interface, converting the low power mode into a normal mode.

18. The method according to claim 17, wherein
the storing the program to control the low power mode in the memory comprises copying the program from another memory used in the normal mode into an executable area of the memory, and
the program includes a USB driver having only a routine to process control end point and a routine to return to the normal mode.

19. The method according to claim 18, wherein the program to control the low power mode stored in the memory requires a lower capacity relative to a USB program stored in the another memory which includes the USB driver copied and stored in the memory.

20. The method according to claim 17, wherein if an interrupt is caused by a data end point, the controlling further comprises reading printing data, storing the printing data in the memory, and converting to the normal mode,
   wherein the method further comprises storing the printing data from the memory in another memory used in the normal mode.

21. The method according to claim 17, wherein the controlling further comprises:
   controlling an operation of the image forming apparatus in the normal mode using a main controller; and
   controlling an operation of the image forming apparatus in the low power mode using a sub-controller, the controlling the operation of the image forming apparatus in the low power mode further comprising:
   supplying power to the sub-controller;
   cutting off power to the main controller;
   checking, by the sub-controller, whether an interrupt is caused by the interface or the data interface; and
   executing, by the sub-controller, the program stored in the memory when an interrupt is caused by the interface.

* * * * *